US011036052B1

(12) United States Patent
Bristol et al.

(10) Patent No.: US 11,036,052 B1
(45) Date of Patent: *Jun. 15, 2021

(54) HEAD-MOUNTED DISPLAY SYSTEMS WITH AUDIO DELIVERY CONDUITS

(71) Applicant: Facebook Technologies, LLC, Menlo Park, CA (US)

(72) Inventors: Peter Wesley Bristol, Seattle, WA (US); Scott Andrew Dallmeyer, Seattle, WA (US); David Tao, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,335

(22) Filed: Feb. 12, 2020

Related U.S. Application Data (63) Continuation of application No. 15/992,195, filed on May 30, 2018, now Pat. No. 10,578,875.

(51) Int. Cl.
*G02B 27/01* (2006.01)
*G06F 3/01* (2006.01)
*H04R 1/02* (2006.01)

(52) U.S. Cl.
CPC ..... *G02B 27/0172* (2013.01); *G02B 27/0176* (2013.01); *G06F 3/011* (2013.01); *H04R 1/028* (2013.01); *G02B 2027/0178* (2013.01)

(58) Field of Classification Search
CPC ............ G02B 27/0172; G02B 27/0176; G02B 2027/0178; G06F 3/011; H04R 1/028
See application file for complete search history.

(56) References Cited

U.S. PATENT DOCUMENTS

| | | | | |
|---|---|---|---|---|
| 4,888,804 A | | 12/1989 | Gefvert | |
| 5,272,757 A | | 12/1993 | Scofield et al. | |
| 5,694,475 A | * | 12/1997 | Boyden | H04R 1/1066 381/327 |
| 5,717,479 A | * | 2/1998 | Rickards | A61F 9/029 351/158 |
| 5,844,530 A | * | 12/1998 | Tosaki | G02B 27/017 345/8 |
| 5,892,564 A | * | 4/1999 | Rahn | G02C 11/10 351/158 |
| 5,991,085 A | * | 11/1999 | Rallison | G02B 27/017 345/8 |
| 6,351,252 B1 | * | 2/2002 | Atsumi | G02B 27/0176 345/8 |

(Continued)

OTHER PUBLICATIONS

Non-Final Office Action received for U.S. Appl. No. 15/992,195 dated Jun. 11, 2019, 40 pages.

(Continued)

*Primary Examiner* — Grant Sitta
(74) *Attorney, Agent, or Firm* — FisherBroyles, LLP (57) ABSTRACT

The disclosed head-mounted display system may include (1) a display for displaying computer-generated imagery, (2) a lens, (3) a peripheral wall extending from a back end to a front end, with the back end coupled to the lens and the front end coupled to the display such that the lens, the peripheral wall, and the display together define an enclosure, and (4) a speaker housed by the enclosure. Various other systems and methods of assembling the same are also disclosed.

20 Claims, 11 Drawing Sheets

(56) References Cited

U.S. PATENT DOCUMENTS

| | | | |
|---|---|---|---|
| 6,369,952 B1 | 4/2002 | Rallison et al. | |
| 6,480,174 B1* | 11/2002 | Kaufmann | G02B 27/0172 |
| | | | 345/7 |
| 8,750,541 B1 | 6/2014 | Dong et al. | |
| 8,890,773 B1* | 11/2014 | Pederson | H04B 1/385 |
| | | | 345/8 |
| 9,558,760 B2 | 1/2017 | Muehlhausen et al. | |
| D785,619 S | 5/2017 | Su | |
| 9,706,286 B1 | 7/2017 | Patel et al. | |
| 9,753,288 B2 | 9/2017 | Osterhout et al. | |
| 10,178,457 B1* | 1/2019 | Tao | G02B 27/017 |
| 10,212,517 B1 | 2/2019 | Beltran et al. | |
| 10,334,343 B2 | 6/2019 | Lu et al. | |
| 10,578,875 B1* | 3/2020 | Bristol | G06F 3/011 |
| 10,728,651 B2* | 7/2020 | Rusconi Clerici Beltrami | |
| | | | G10K 11/26 |
| 2005/0159182 A1* | 7/2005 | Lai | H04M 1/6066 |
| | | | 455/556.1 |
| 2007/0030442 A1* | 2/2007 | Howell | G02C 11/10 |
| | | | 351/158 |
| 2008/0144854 A1* | 6/2008 | Abreu | G02C 3/003 |
| | | | 381/74 |
| 2008/0191965 A1 | 8/2008 | Pandozy | |
| 2010/0045928 A1 | 2/2010 | Levy | |
| 2010/0079356 A1* | 4/2010 | Hoellwarth | G09G 5/14 |
| | | | 345/8 |
| 2010/0080400 A1* | 4/2010 | Sibbald | H04R 1/1083 |
| | | | 381/71.6 |
| 2013/0272546 A1 | 10/2013 | Besgen, Sr. | |
| 2014/0062841 A1 | 3/2014 | Ishikawa et al. | |
| 2014/0176398 A1 | 6/2014 | West et al. | |
| 2014/0268013 A1 | 9/2014 | Howell et al. | |
| 2014/0268016 A1* | 9/2014 | Chow | H04R 3/005 |
| | | | 351/158 |
| 2014/0270316 A1* | 9/2014 | Fan | G02C 11/10 |
| | | | 381/381 |
| 2015/0015461 A1 | 1/2015 | Morimoto | |
| 2015/0237430 A1* | 8/2015 | Han | H04R 1/028 |
| | | | 381/381 |
| 2015/0296285 A1 | 10/2015 | Proos et al. | |
| 2016/0363771 A1* | 12/2016 | Miller | H04R 1/105 |
| 2017/0195775 A1 | 7/2017 | Morris et al. | |
| 2018/0255386 A1 | 9/2018 | Bristol et al. | |

OTHER PUBLICATIONS

Final Office Action received for U.S. Appl. No. 15/992,195 dated Sep. 13, 2019, 47 pages.

Notice of Allowance received for U.S. Appl. No. 15/992,195 dated Nov. 4, 2019, 51 pages.

* cited by examiner

HEAD-MOUNTED DISPLAY SYSTEMS WITH AUDIO DELIVERY CONDUITS

CROSS-REFERENCE TO RELATED APPLICATION

This application is a continuation of U.S. patent application Ser. No. 15/992,195, titled "HEAD-MOUNTED DISPLAY WITH INTEGRATED SPEAKER ENCLOSURE," filed May 30, 2018, the entire disclosure of which is hereby incorporated by reference.

BACKGROUND

Head-mounted displays have applications in a variety of fields, including engineering design, medical surgery practice, simulated military practice, and video gaming. For example, an augmented reality ("AR") or virtual reality ("VR") head-mounted display may allow users to experience realistic, immersive virtual or mixed-reality environments while playing video games, during flight simulation training, or when interacting with co-workers around the globe.

The audio experience provided by a head-mounted display's audio subsystem (such as via integrated or detachable headphones) is often just as important to realizing an immersive and realistic AR/VR experience as the visual imagery that is produced by the head-mounted display. Unfortunately, the audio delivery systems that are typically integrated within conventional head-mounted displays often lack the frequency response necessary to generate sonically rich and accurate auditory experiences. Moreover, any attempt to improve the audio experience of a head-mounted display typically results in corresponding increases in size and weight, which is an often-unacceptable compromise given end users' reluctance to purchase or use bulky or heavy head-mounted displays due to aesthetics or discomfort.

SUMMARY

As will be described in greater detail below, the present disclosure describes a variety of head-mounted display systems in which the system's existing lens(es) and display(s) double as an (at least partial) enclosure for one or more speakers. For example, a head-mounted display system may include (1) a display for displaying computer-generated imagery, (2) a lens, (3) a peripheral wall extending from a back end to a front end, with the back end coupled to the lens and the front end coupled to the display such that the lens, the peripheral wall, and the display together define an enclosure, and (4) a speaker housed by the enclosure.

In some examples, the speaker may be at least partially disposed within the peripheral wall. For example, an aperture may extend through the peripheral wall from an enclosure interior to an enclosure exterior, and at least a portion of the speaker may be positioned within the aperture. In this example, the speaker may include a diaphragm that is disposed within the aperture, with the diaphragm being configured to move inwards towards the enclosure interior and outwards towards the enclosure exterior. In addition, the aperture may be defined by a cylindrical protrusion that extends outwards from the peripheral wall into the enclosure exterior.

In one example, the speaker may be positioned within the aperture of the peripheral wall such that the speaker emits front-volume sound to the enclosure exterior and emits back-volume sound to the enclosure interior. In this example, the head-mounted display system may also include an audio delivery conduit, extending from the aperture in a rearward direction, that is dimensioned to direct the front-volume sound from the speaker toward a user's ear. In some examples, at least a portion of the audio delivery conduit may be defined within a strap assembly configured to mount the head-mounted display system to the user's head.

In some examples, the head-mounted display system may also include (1) a second lens and (2) a partition wall, disposed between the lens and the second lens, that partitions the enclosure into a first enclosure that houses the speaker and a second enclosure that houses a second speaker. In another example, the head-mounted display system may include (1) a second lens, (2) a second peripheral wall extending from a second back end to a second front end, with the second back end coupled to the second lens and the second front end coupled to the display such that the second lens, the second peripheral wall, and the display together define a second enclosure, and (3) a second speaker housed within the second enclosure. In this example, the display may include (1) a first display coupled to the front end of the peripheral wall and (2) a second display coupled to the second front end of the second peripheral wall.

A method of assembling the above-described head-mounted display system may include (1) coupling a back end of a peripheral wall to a lens, (2) coupling a front end of the peripheral wall to a display such that the lens, the peripheral wall, and the display together define an enclosure, and (3) positioning at least a portion of a speaker within the enclosure. In some examples, positioning at least a portion of the speaker within the enclosure may include positioning at least a portion of the speaker within an aperture that extends through the peripheral wall from an enclosure interior to an enclosure exterior. Positioning at least a portion of the speaker within the aperture may also include positioning a diaphragm of the speaker within the aperture such that the diaphragm moves inwards towards the enclosure interior and outwards towards the enclosure exterior.

In some examples, the aperture may be defined by a cylindrical protrusion that extends outwards from the peripheral wall into the enclosure exterior. In addition, the speaker may be positioned within the aperture such that the speaker emits front-volume sound to the enclosure exterior and emits back-volume sound to the enclosure interior.

In one example, the display, the lens, and the peripheral wall may together define an optical assembly. In this example, the method may also include mounting the optical assembly within a housing of the head-mounted display system. In some examples, the method may also include coupling a strap assembly to the housing. In these examples, the strap assembly may (1) be configured to mount the head-mounted display system to a user's head and (2) define an audio delivery conduit that (a) extends from the aperture in a rearward direction toward the user's ear and (b) is dimensioned to direct front-volume sound from the speaker toward a user's ear.

A corresponding optical assembly may include (1) a display for displaying computer-generated imagery, (2) a lens, (3) a peripheral wall extending from a back end to a front end, with the back end being coupled to the lens and the front end being coupled to the display such that the lens, the peripheral wall, and the display together define an enclosure, and (4) a speaker housed by the enclosure. In some examples, the speaker may be at least partially disposed within the peripheral wall such that the speaker emits front-volume sound to an enclosure exterior and emits back-volume sound to an enclosure interior.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Traditional head-mounted display (HMD) systems typically provide audio to a user via a speaker arrangement that is physically separated from its display components. For example, in a traditional HMD system, a lens, a display screen, and a conical "eyecup" enclosure may together form an optical assembly designed to present computer-generated imagery to a user. In this example, left and right headphones (and their corresponding speakers and speaker enclosures, if any) are typically positioned adjacent to the end-user's ears, entirely separate from and outside of the HMD's optical assembly.

In traditional HMD systems, it is generally disadvantageous to provide large speaker enclosures due to size and weight concerns. Larger speaker enclosures, however, typically provide more robust and accurate sound, thus improving the immersive feel and overall user experience. As will be described in greater detail below, the present disclosure describes a variety of HMD systems in which the HMD's existing lens(es) and display(s) (and, in some cases, a connecting wall, such as a conical eyecup wall) double as a relatively large enclosure for one or more speakers. For example, an exemplary HMD according to the present disclosure may include (1) a display for displaying computer-generated imagery, (2) a lens, (3) a peripheral wall (such as a conical eyecup wall) extending from a back end to a front end, with the back end coupled to the lens and the front end coupled to the display such that the lens, the peripheral wall, and the display together define an enclosure, and (4) a speaker housed by the enclosure. As detailed below, by leveraging these existing elements, the HMD systems described herein may be able to provide a relatively large speaker enclosure for one or more speakers, resulting in a more accurate and immersive audio experience for end users without significantly increasing the overall size or weight of the HMD. In some examples, the size, shape, and/or material used to define these enclosures may also be tuned to improve the frequency response (e.g., high- or low-frequency response) of the corresponding speakers, resulting in an improved listening experience for end users.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

Figure 1:
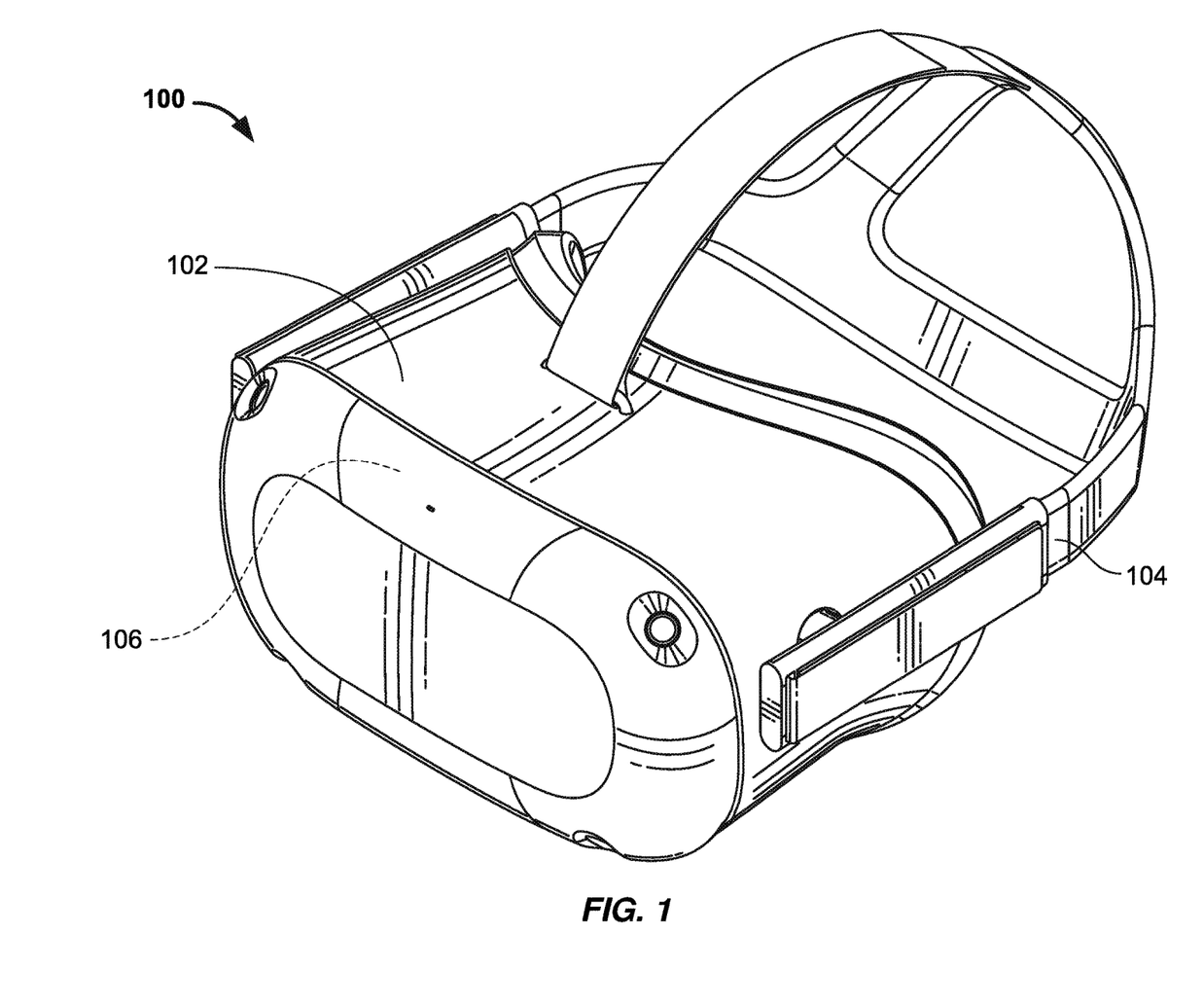
FIG. 1 is a perspective view of an exemplary head-mounted display in which a lens, a display, and a connecting wall together define an enclosure for a speaker.
Figure 2:
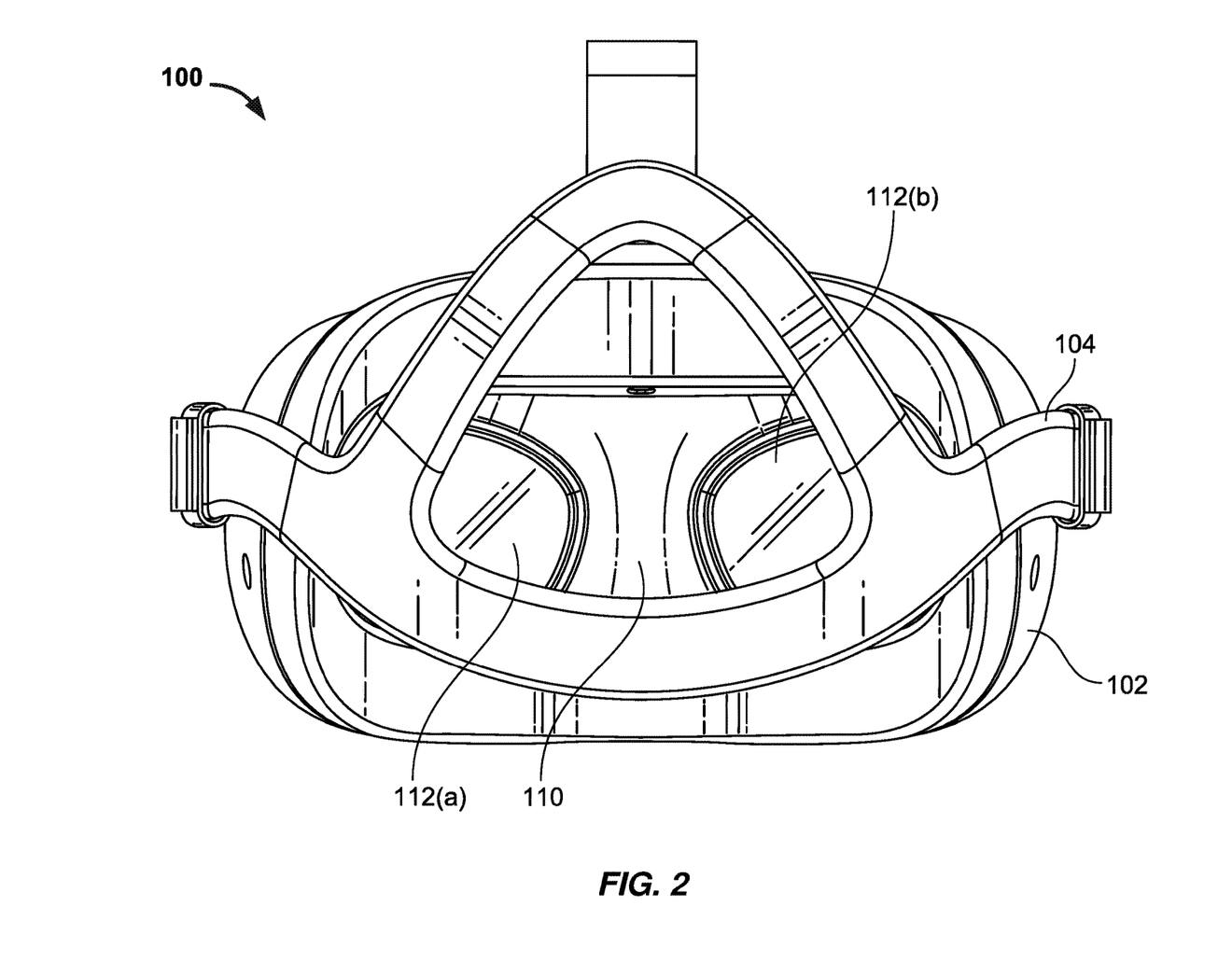
FIG. 2 is a back view of the head-mounted display illustrated in FIG. 1.
Figure 3:
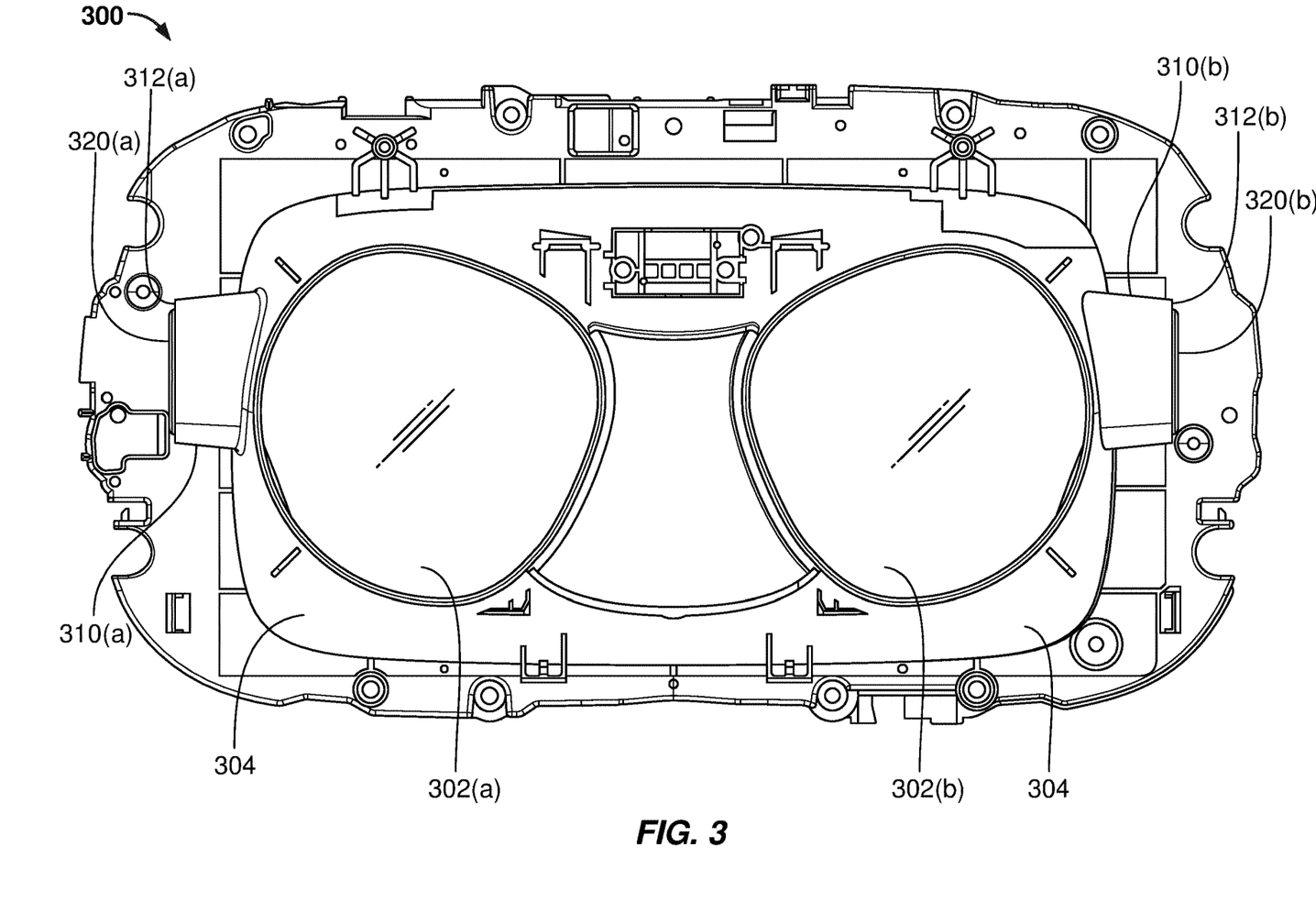
FIG. 3 is a back view of an exemplary optical assembly for a head-mounted display in which a lens, a display, and a connecting wall together define an enclosure for a speaker.
Figure 4:
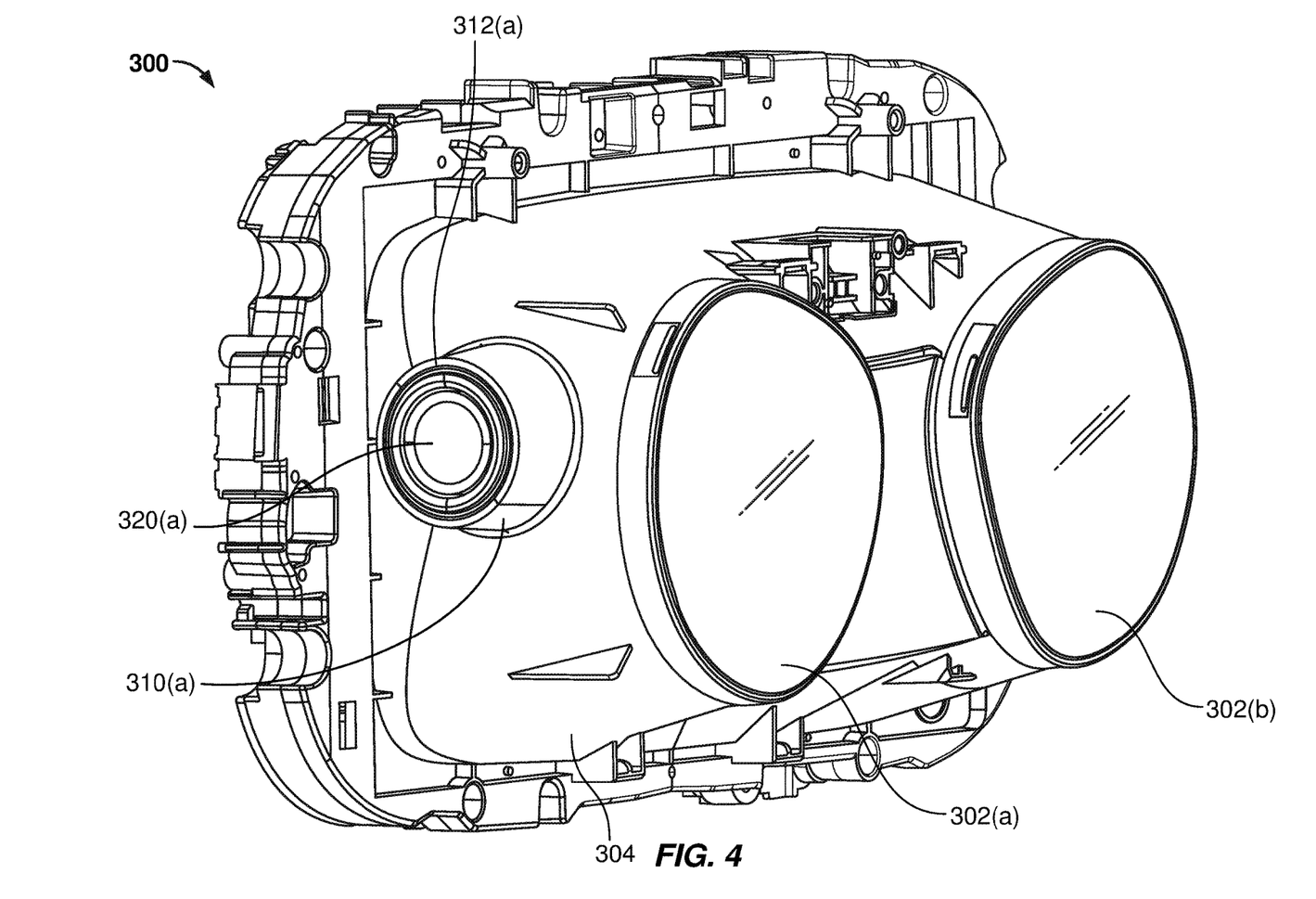
FIG. 4 is a perspective view of the optical assembly illustrated in FIG. 3.

FIGS. 1-2 are perspective and back views, respectively, of an exemplary head-mounted display system 100. The term "head-mounted display" (HMD) may, in some examples, refer to a display device or system that is worn on or about a user's head and that displays visual content to a user. HMDs may display content in any suitable manner, including via a screen (e.g., an LCD or LED screen), an optical combiner, waveguide, lens, etc. HMDs may display content in one or more of various media formats. For example, an HMD may display video, photos, and/or computer-generated imagery.

HMDs may provide diverse and distinctive user experiences. Some HMDs may provide virtual-reality experiences (i.e., they may display computer-generated or pre-recorded content), while other HMDs may provide real-world experiences (i.e., they may display live imagery from the physical world). HMDs may also provide any mixture of live and virtual content. For example, virtual content may be projected onto the physical world (e.g., via optical or video see-through), which may result in augmented reality or mixed-reality experiences. HMDs may be mounted to a user's head in a number of ways. Some HMDs may be incorporated into glasses, headsets, or visors. Other HMDs may be incorporated into helmets, hats, or other headwear.

As illustrated in FIG. 1, exemplary HMD system 100 may include a housing 102 and a strap assembly 104 configured to mount HMD system 100 to a user's head. Housing 102 may be dimensioned to house a variety of components and/or subsystems designed to present VR or AR experiences to a user. Example components include image capture subsystems (e.g., one or more optical image sensors or cameras configured to capture and collect image data from a local area or environment surrounding some or all of HMD system 100), depth sensing subsystems (configured, e.g., to capture data describing depth information characterizing the local environment), eye-tracking subsystems (configured, e.g., to track the eyes of a user of HMD system 100 to measure or estimate the user's gaze, interpupillary distance, and/or focal distance), motion-sensing subsystems (such as an inertial measurement unit (IMU) configured to generate one or more measurement signals in response to motion of HMD system 100 for use in tracking the position and/or orientation of the same), input devices (such as hand-held controllers, keyboards, mice, etc.), processing subsystems (e.g., one or more processing devices or physical processors configured to process, analyze, render, etc. data generated or received by the other subsystems within HMD system 100), display subsystems (including, e.g., one or more display elements, lenses, etc. configured to display two-dimensional or three-dimensional images to the user in accordance with data received from the processing subsystem), varifocal subsystems configured to adjust the focal distance/length of the HMD system 100 (by, e.g., physically adjusting the distance between the user's eyes and the display), and/or any other component or subsystem capable of generating or enhancing VR or AR content.

In some embodiments, strap assembly 104 may enable a user to adjustably mount HMD system 100 to a user's head. As shown in FIG. 1, strap assembly 104 may include one or more upper, lower, and/or side straps that adjustably conform to the top and/or sides of the user's head when the user is wearing HMD system 100. In some embodiments, strap assembly 104 may include a back piece coupled with the upper and side straps to rest against the back of the user's head (e.g., around the user's occipital lobe).

In one example, and as shown in FIG. 2, HMD system 100 may include an optical assembly 110 mounted within or coupled to housing 102 of HMD system 100. Optical assembly 110 may dimensioned in a variety of shapes and sizes and may include a variety of different components. In one example, optical assembly 110 may include at least one display 106 and at least one lens (e.g., lenses 112(a) and 112(b)). As will be explained in greater detail below, in at least one example, lenses 112(a)/112(b), display 106, and/or a connecting wall may together define an enclosure for a speaker designed to deliver audio content to a user of HMD system 100. In some embodiments, this audio content may be generated by HMD system 100 (by, e.g., the above-described processing subsystem).

FIGS. 3-7 are back, perspective, cut-away, and cross-sectional views, respectively, of an exemplary optical assembly 300 for an HMD (such as HMD system 100 in FIG. 1) in which a lens, a display, and/or a connecting wall of the HMD may together define an enclosure for a speaker. As shown in these figures, optical assembly 300 may include at least one lens (e.g., lenses 302(a)-(b)) and at least one display 330.

Display 330 generally represents any type or form of electronic element capable of presenting visual content. Display 330 may include a single electronic display or multiple electronic displays (e.g., a display for each eye of a user). Examples of display 330 include, without limitation, a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, another suitable display, or some combination thereof. In some examples, display 330 may be optically transparent such that the user can see the local environment through the display. In other examples, display 330 may be opaque such that the user cannot see the local environment through display 330.

Lenses 302(a)-(b) generally represent any type or form of transmissive optical element or device that is capable of converging (i.e., focusing) and/or diverging (i.e., dispersing) light. Examples of such lenses include, without limitation, simple lenses, compound lenses (e.g., so-called doublet or triplet lenses), Fresnel lenses, liquid lenses, lenticular lenses, etc. These lenses may have a variety of properties, including accommodative properties (i.e., the ability to adjust optical power) and/or adaptive properties (i.e., the ability to control, compensate, or correct for wavefront errors such as distortion and aberrations). In some examples, a user may look through lenses 302(a)-(b) to view computer-generated imagery presented on display 330.

In some embodiments, lenses 302(a)-(b) and display 330 (and in some cases a connecting wall) may together define or form an enclosure for one or more speakers, such as speakers 320(a)-(b). Lenses 302(a)-(b) may be coupled or connected to display 330 in a variety of ways. In one example, lenses 302(a)-(b) may be coupled or connected to display 330 via a connecting wall, such as peripheral wall 304. In other examples, lenses 302(a)-(b) may be directly coupled or connected to display 330 via speakers 320(a)-(b), such that speakers 320(a)-(b) form all or a portion of peripheral wall 304. In some cases, peripheral wall 304 may define or form all or a part of a conical eyecup for an HMD, such as HMD system 100. In these examples, peripheral wall 304 may be made of an opaque material designed to block light and thus enable a user to more easily view computer-generated imagery displayed on display 330.

Figure 6:
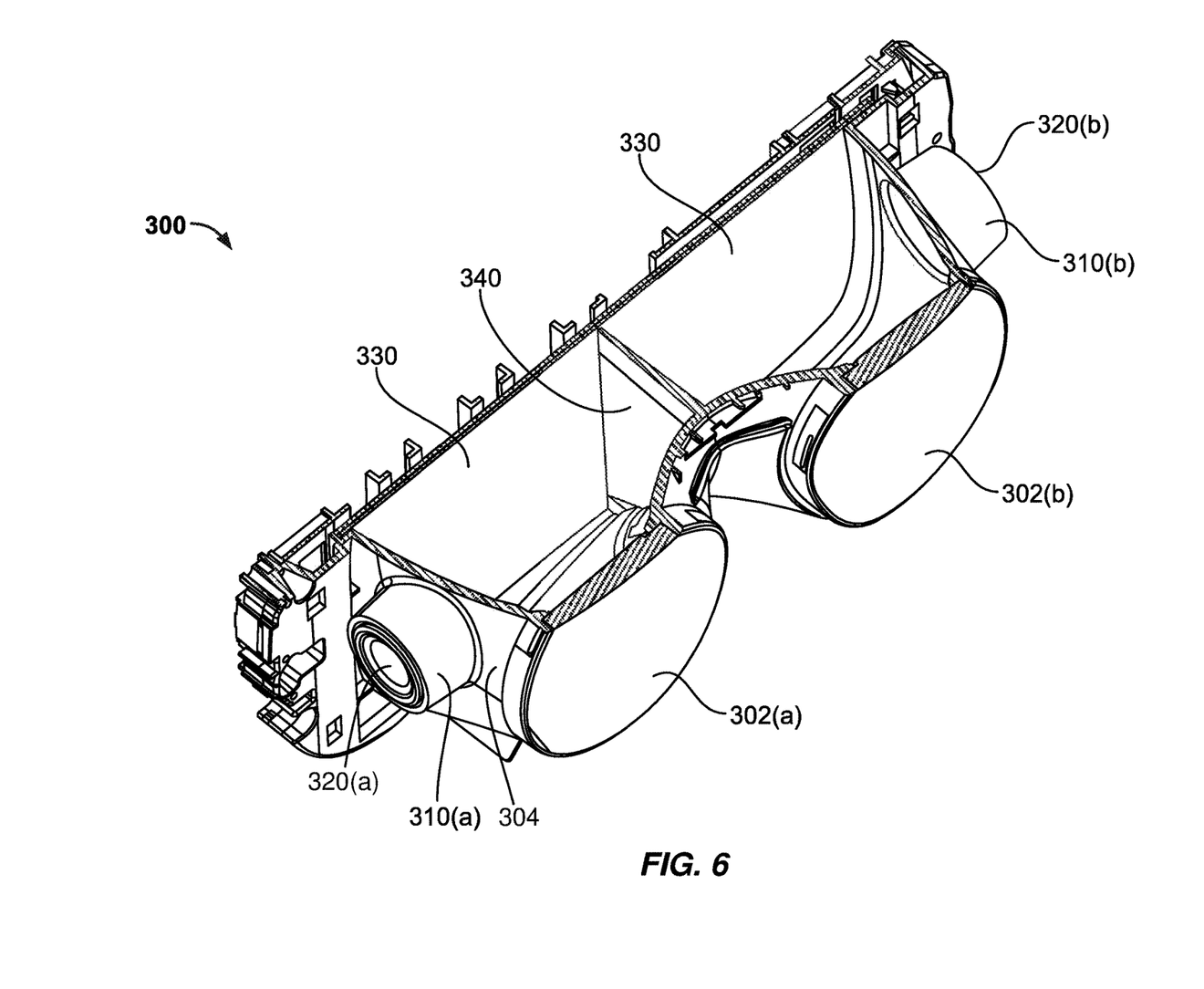
FIG. 6 is a perspective cut-away view of the optical assembly illustrated in FIG. 3.
Figure 7:
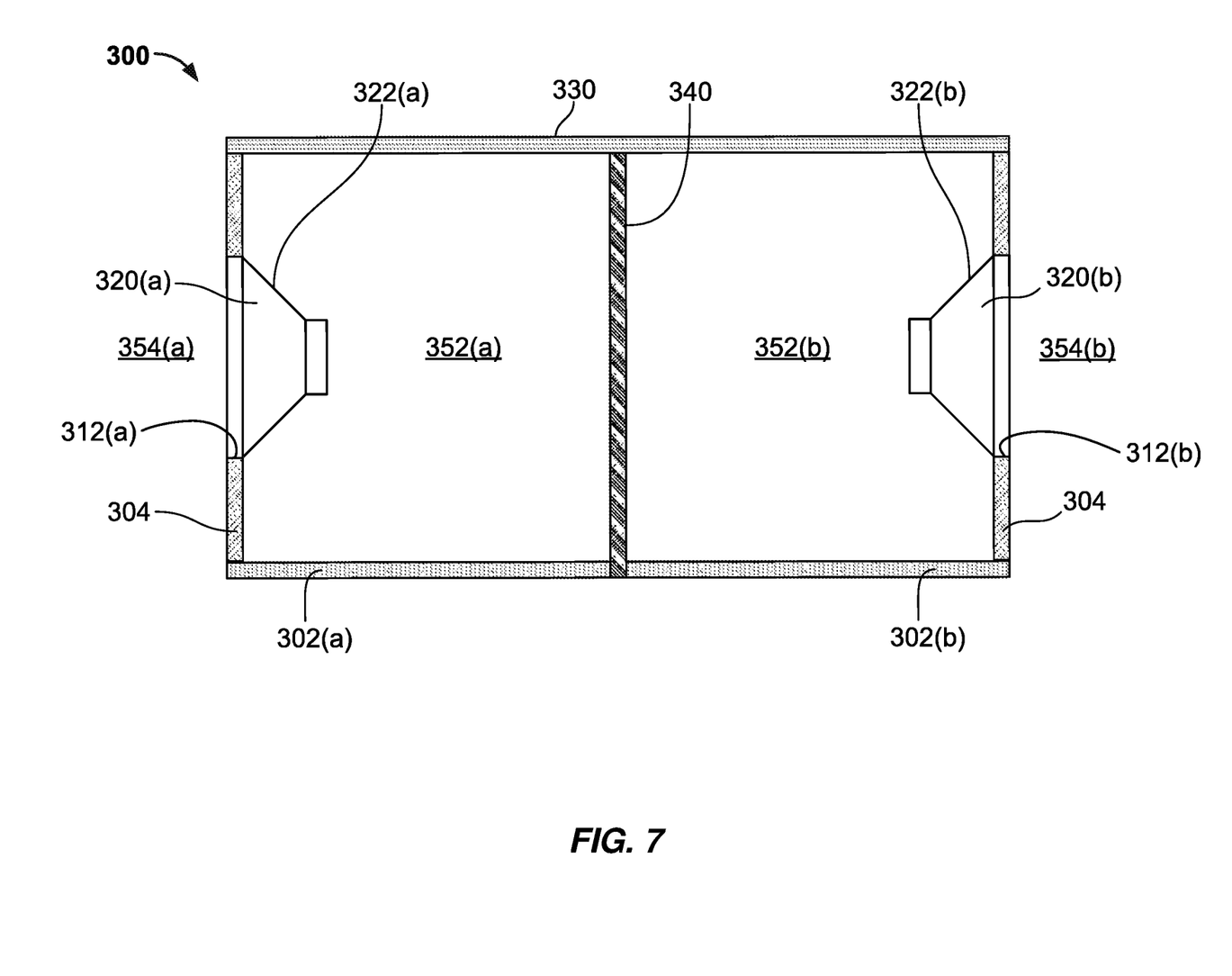
FIG. 7 is a top cross-sectional view of an exemplary optical assembly in which a lens, a display, and a connecting wall together define an enclosure for a speaker.

In one example, and as best illustrated in FIGS. 6 and 7, a back end of peripheral wall 304 may be coupled to lenses 302(a)-(b) and a front end of peripheral wall 304 may be coupled to display 330. Together, lenses 302(a)-(b), display 330, and peripheral wall 304 may define or form an enclosure for speakers 320(a)-(b). In some embodiments, a partition wall 340 may extend within and partition the enclosure into a left enclosure 352(a) and a right enclosure 352(b). For example, left lens 302(a), peripheral wall 304, display screen 330, and partition wall 340 may together define a left enclosure 352(a), while right lens 302(b), peripheral wall 304, display screen 330, and partition wall 340 may together define a right enclosure 352(b). In this example, left enclosure 352(a) may serve as a loudspeaker enclosure for left speaker 320(a), while right enclosure 352(b) may serve as a loudspeaker enclosure for right speaker 320(b).

In some examples, one or both of speakers 320(a)-(b) may be at least partially disposed within peripheral wall 304. For example, and as best illustrated in FIG. 7, speakers 320(a)-(b) may be respectively positioned within apertures 312(a)-(b) defined in peripheral wall 304. In this example, apertures 312(a)-(b) may respectively extend through peripheral wall 304 from the interior of enclosures 352(a)-(b) to the exterior 354(a)-(b) of enclosures 352(a)-(b). Apertures 312(a)-(b) may be formed in any of a variety of shapes and sizes. In one example, speakers 320(a)-(b) may have a substantially circular periphery and apertures 312(a)-(b) may be substantially cylindrical in shape to accommodate the shape of speakers 320(a)-(b).

Figure 5:
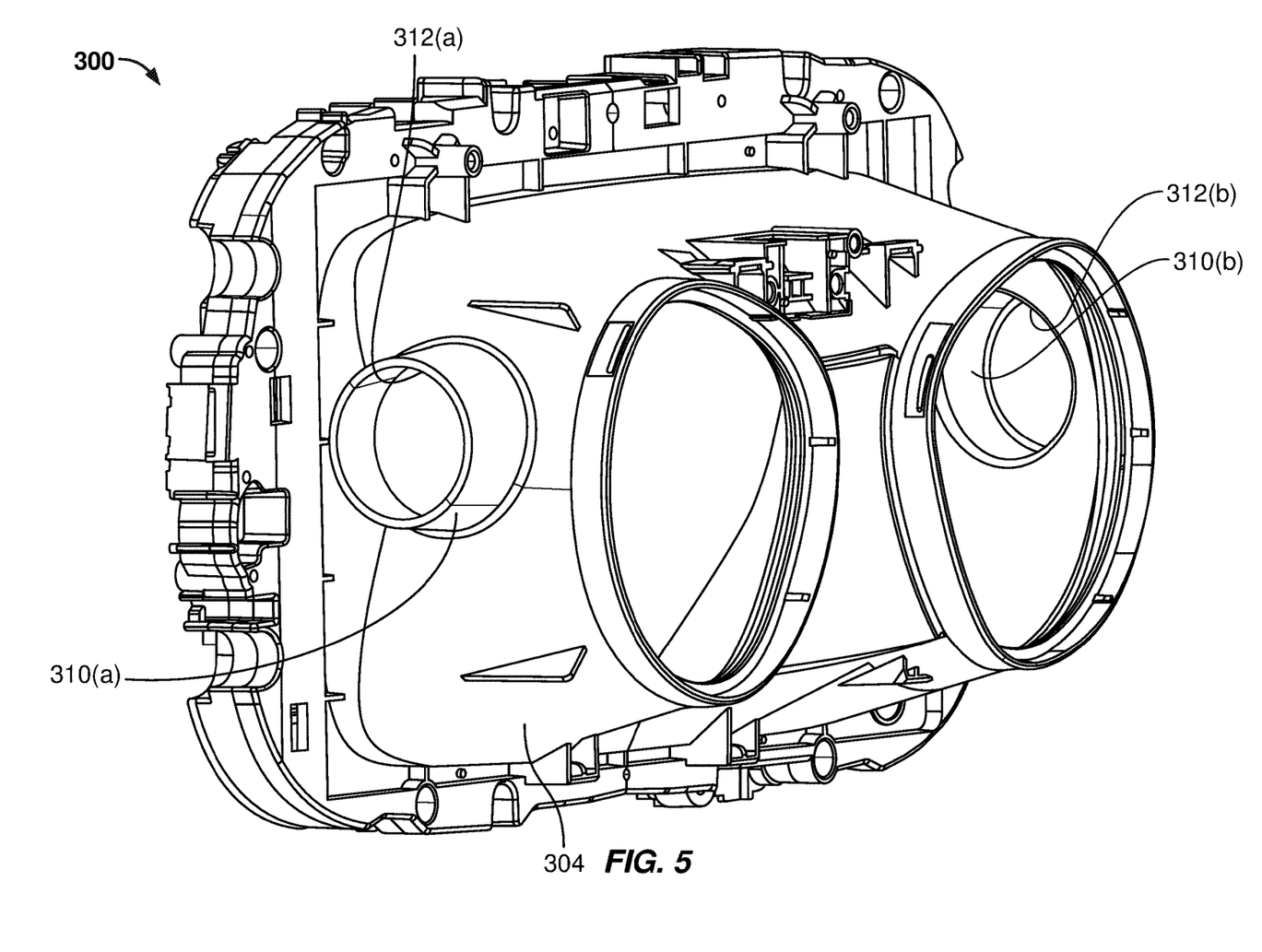
FIG. 5 is a perspective view of the optical assembly illustrated in FIG. 3 with its speakers and lenses removed.

As best shown in FIG. 7, speakers 320(a)-(b) may each include a respective diaphragm 322(a)-(b) at least partially disposed within a respective aperture 312(a)-(b). In some examples, diaphragms 322(a)-(b) may have a circumference that is substantially equal to the circumference of its respective aperture 312(a)-(b). In one example, and as best shown in FIGS. 5-6, apertures 312(a)-(b) may be defined by respective cylindrical protrusions 310(a)-(b) that extend outward from peripheral wall 304 and into enclosure exteriors 354(a)-(b).

In some embodiments, a coil may be disposed behind each diaphragm 322(a)-(b) and in front of a permanent magnet. The coil may be electrically coupled to an audio subsystem (such as an audio subsystem included within HMD system 100). In this example, the audio subsystem may cause electricity to travel back and forth to the coil, such that the coil (acting as a temporary magnet or electromagnet) attracts or repels the permanent magnet, thus moving the coil backward and forward. As the coil moves backward and forward, it may pull and push its respective diaphragm 322(a)-(b). These moving diaphragms 322(a)-(b) may in turn push on the air surrounding the same to create sound waves.

As diaphragms 322(a)-(b) move forward toward enclosure exteriors 354(a)-(b), diaphragms 322(a)-(b) may generate forward-facing sound waves in enclosure exteriors 354(a)-(b)—these sound waves are sometimes referred to as "front-volume sound." In contrast, as diaphragms 322(a)-(b) move backward toward their respective enclosures 352(a)-(b), diaphragms 322(a)-(b) may generate rearward-facing sound waves within enclosures 352(a)-(b)—these sound waves are sometimes referred to as "back-volume sound." Because these forward- and rearward-facing sound waves are often out of phase with each other, any interaction between the two within a listening environment can distort the original signal, resulting in unintended echoes, reverberations, etc. By positioning speakers 320(a)-(b) within enclosures 352(a)-(b), however, the systems described herein may effectively reduce or eliminate the negative interactions between these forward- and rearward-facing sound waves, resulting in a more accurate (or, in some cases, an enhanced or improved) listening experience for the end user.

In some examples, the size, shape, and/or material used to define enclosures 352(a)-(b) (among other properties) may be tuned so as to improve the frequency response (e.g., high- or low-frequency response) of speakers 320(a)-(b). Since, as detailed above, the rear of a speaker radiates sound waves that are out of phase from sound waves that are radiated from the front of the speaker, these sound waves may, when they interact with each other, result in constructive or destructive interference. Accordingly, in some examples enclosures 352(a)-(b) may be designed with these potential interferences in mind in an attempt to improve the overall listening experience of an end user. Any of a variety of properties may be considered when designing enclosures 352(a)-(b), including the materials used to form enclosures 352(a)-(b) (e.g., reflective versus absorptive/dampening materials), the size and/or shape of enclosures 352(a)-(b) (e.g., whether a particular size or shape impacts the frequency response of speakers 320(a)-(b)), whether to define or include ports (such as a bass ports) within enclosures 352(a)-(b), etc.), etc.

Figure 8:
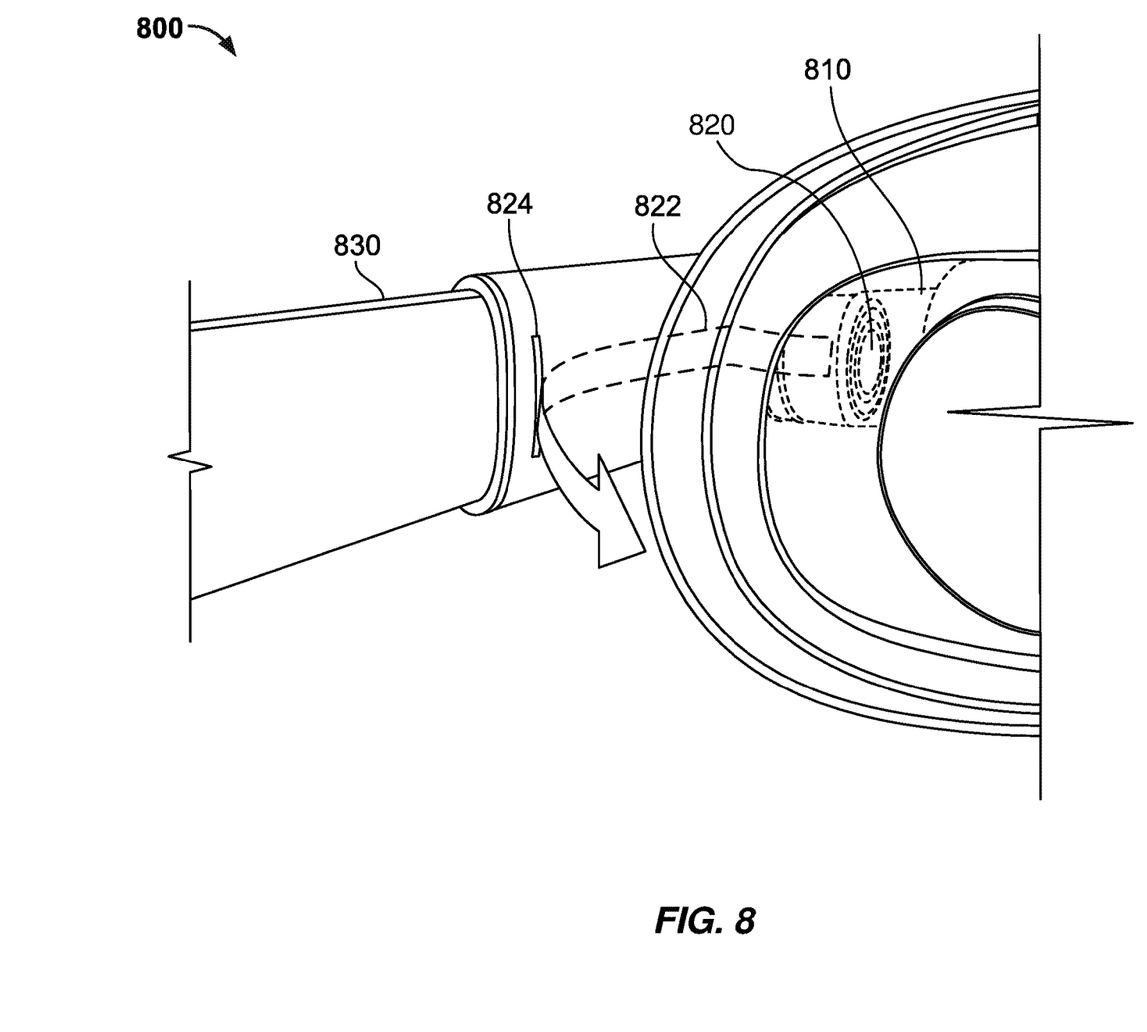
FIG. 8 is a perspective view of an exemplary head-mounted display that includes an audio delivery conduit dimensioned to direct front-volume sound from a speaker to a user's ear.

In some examples, and as shown in FIG. 8, the optical assemblies described herein may be incorporated into an HMD 800 that includes an audio delivery conduit 822 designed to direct sound waves generated by a speaker 820 toward a user's ear when wearing HMD 800. In one embodiment, and as illustrated in this figure, at least a portion of audio delivery conduit 822 may be defined within a strap assembly 830 of HMD 800. In this embodiment, sound waves generated by a speaker 820 within cylindrical enclosure 810 (e.g., forward-facing sound waves or front-volume sound generated by speaker 820) may be directed via audio delivery conduit 822 through strap assembly 830 and out an exit port 824. In one embodiment, exit port 824 may be positioned proximate a user's ear to enhance the listening experience of the user.

Figure 9:
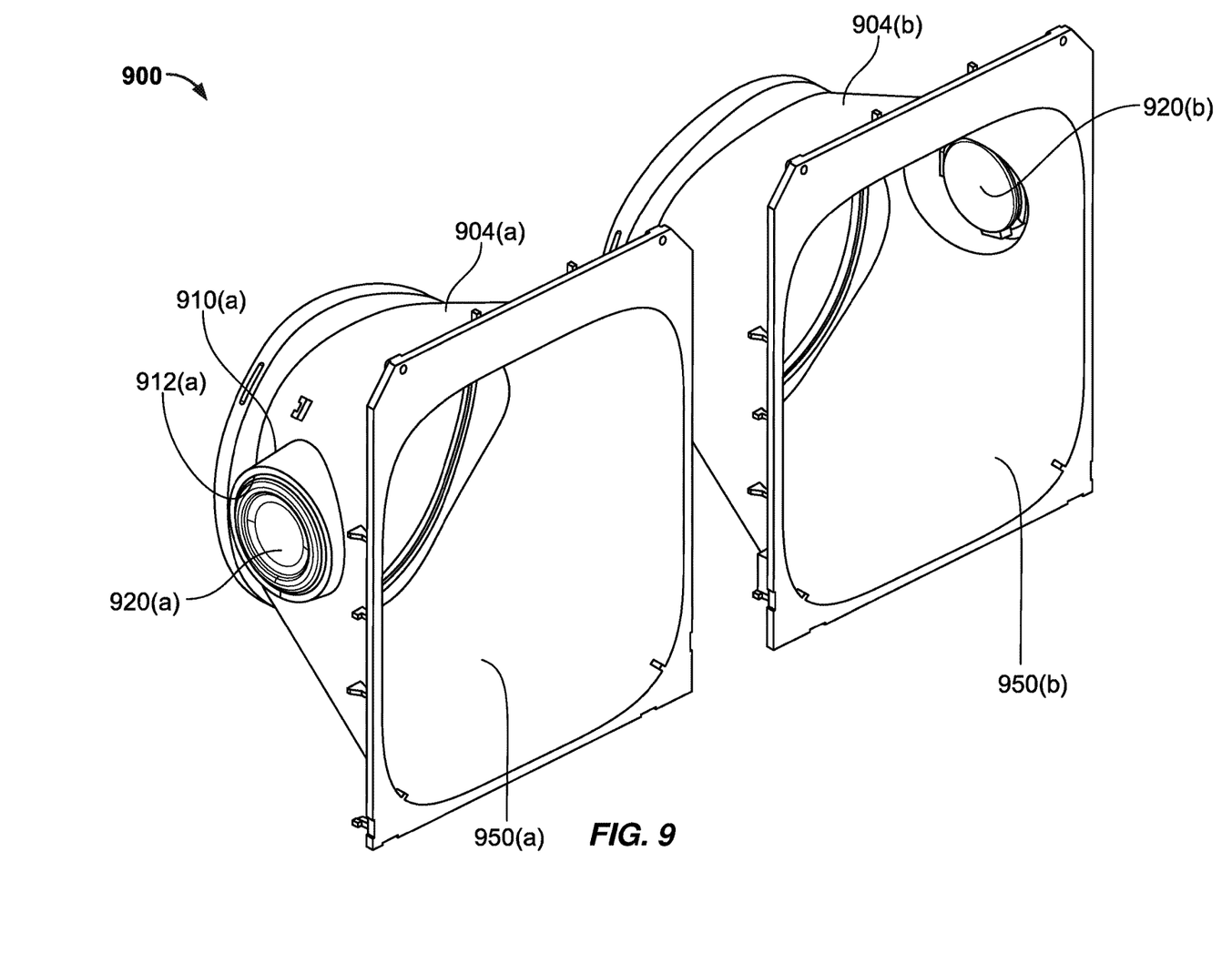
FIG. 9 is a perspective view of an exemplary dual-display optical assembly for a head-mounted display in which each lens, display, and connecting wall together define an enclosure for a speaker.
Figure 10:
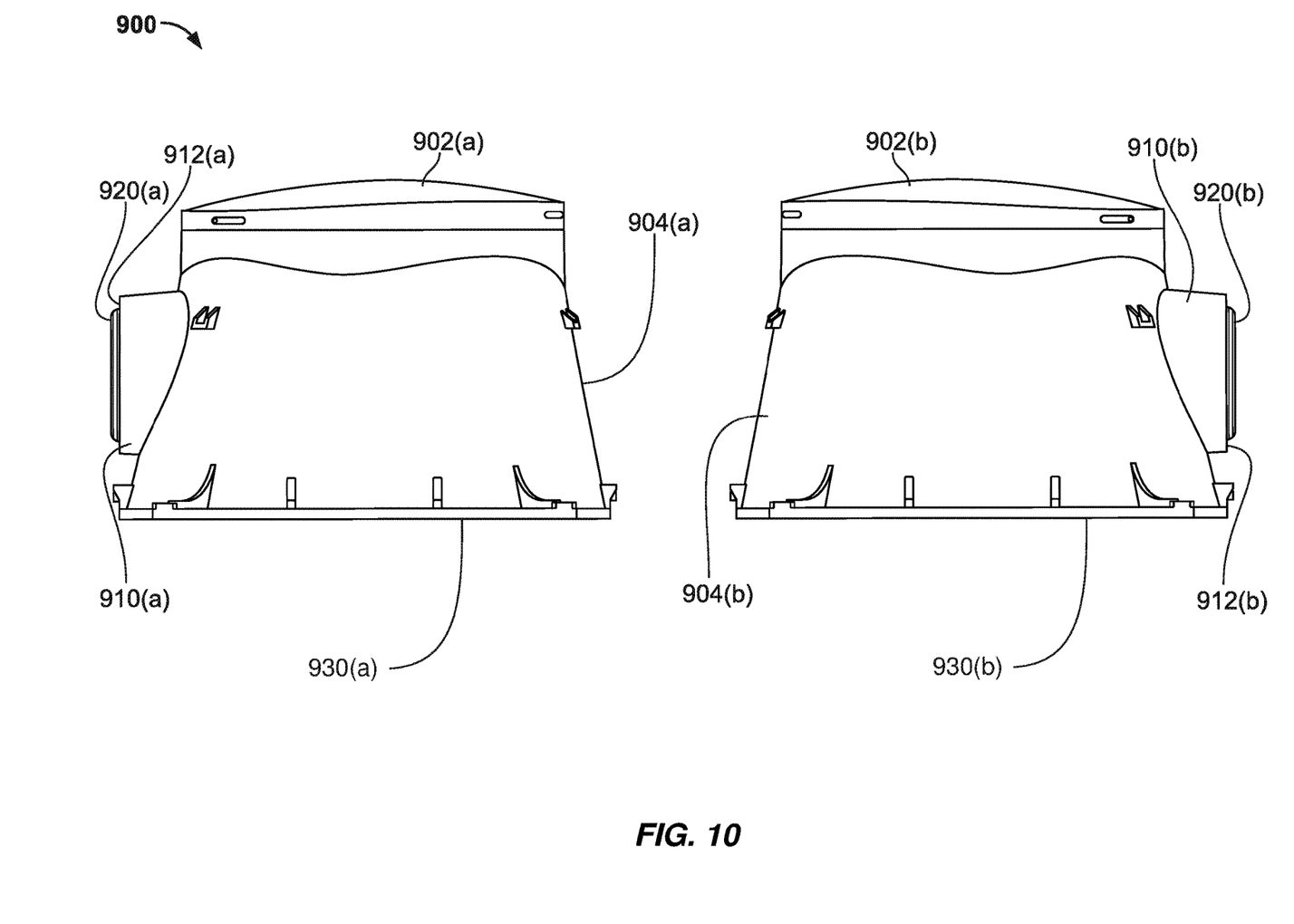
FIG. 10 is top view of the optical assembly illustrated in FIG. 9.

While the HMD systems described and illustrated in connection with FIGS. 1-7 contain a single display, the principles described herein may also be extended to HMD systems that include multiple display elements. FIGS. 9-10 are perspective and top views, respectively, of an exemplary dual-display optical assembly 900 for an HMD (such as HMD system 100 in FIG. 1) in which each lens, display, and connecting wall together define an enclosure for a speaker.

As shown in these figures, a left lens 902(a) may be positioned behind a left display 930(a). Similarly, a right lens 902(b) may be positioned behind a right display 930(b). In addition, a left peripheral wall 904(a) may couple left lens 902(a) to left display 930(a), while a right peripheral wall 904(b) may couple right lens 902(b) to right display 930(b). In this embodiment, left lens 902(a), left display 930(a), and left peripheral wall 904(a) may together define a left enclosure 950(a), while right lens 902(b), right display 930(b), and right peripheral wall 904(b) may together define a right enclosure 950(b). As illustrated in FIGS. 9-10, a left speaker 920(a) may be housed within left enclosure 950(a) while a right speaker 920(b) may be housed within right enclosure 950(b). For example, left speaker 920(a) may be positioned within a left aperture 912(a) defined by a left cylindrical protrusion 910(a), while right speaker 920(b) may be positioned within a right aperture 912(b) defined by a right cylindrical protrusion 910(b). Further configuration and functionality of optical assembly 900 may be similar to the configuration and functionality of optical assembly 300 described in connection with FIGS. 1-7 above.

Figure 11:
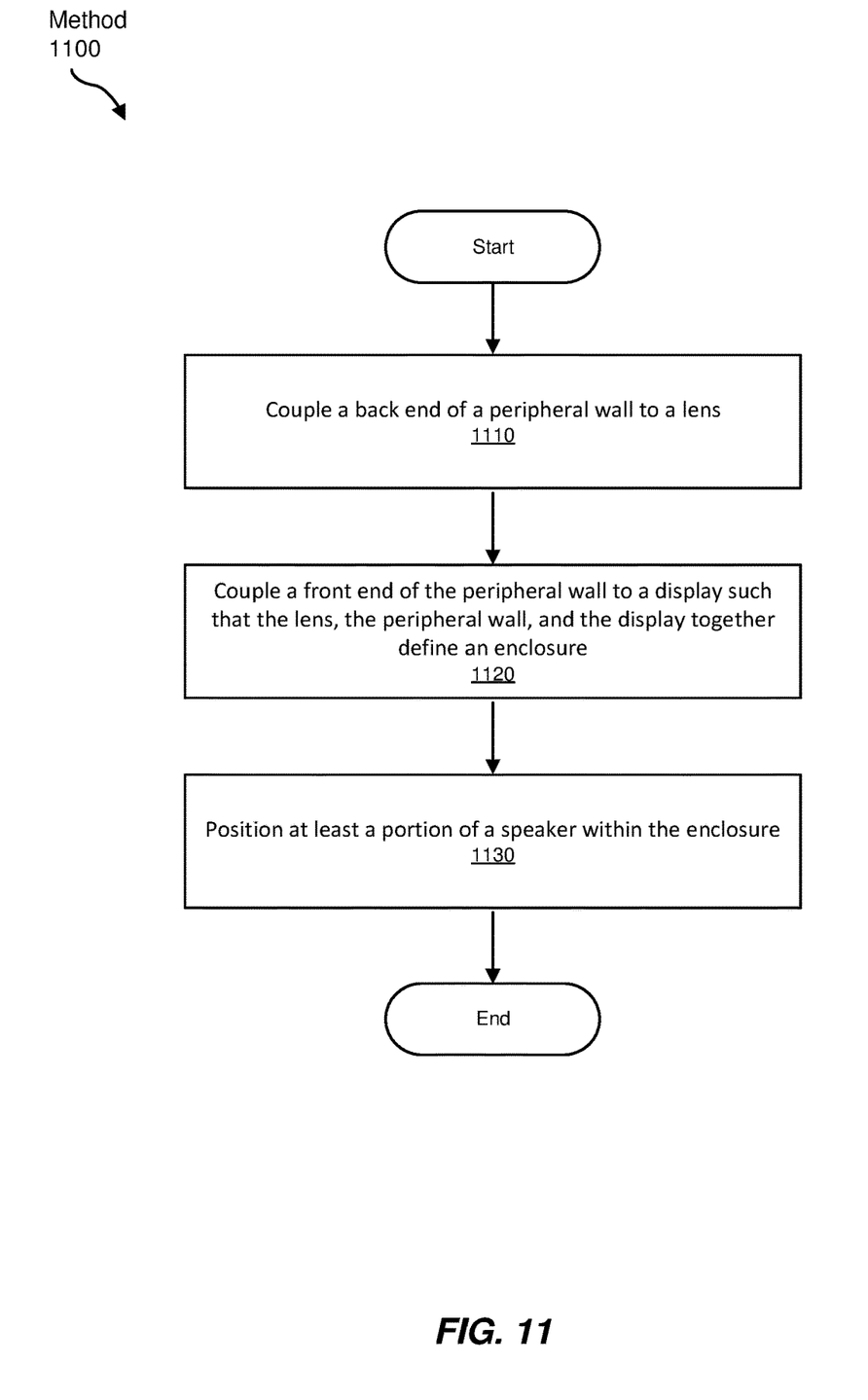
FIG. 11 is a flowchart of an exemplary method of assembling a head-mounted display system in which a lens, a display, and a connecting wall together define an enclosure for a speaker.

FIG. 11 illustrates a flowchart of an exemplary method 1100 of assembling an HMD in which a lens, a display, and a connecting wall together define an enclosure for a speaker. As shown in this figure, at step 1110 a back end of a peripheral wall may be coupled to a lens. For example, the back end of peripheral wall 304 in FIGS. 1-7 may be coupled to lens 302(a).

At step 1120, a front end of the peripheral wall may be coupled to a display such that the lens, the peripheral wall, and the display together form an enclosure. For example, the front end of peripheral wall 304 in FIGS. 1-7 may be coupled to display 330 such that lens 302(a), peripheral wall 304, and display 330 together form enclosure 352(a).

At step 1130, at least a portion of a speaker may be positioned within the enclosure defined by the lens, display, and peripheral wall. For example, at least a portion of speaker 320(a) in FIGS. 1-7 may be positioned within enclosure 352(a). In one example, positioning the speaker within the enclosure may include positioning the speaker within an aperture, defined in the peripheral wall, that extends from an enclosure interior to an enclosure exterior. For example, speaker 320(a) may be positioned within aperture 312(a). In this example, diaphragm 322(a) of speaker 320(a) may be positioned within aperture 312(a) such that diaphragm 322(a) moves inwards towards enclosure 352(a) and outwards towards enclosure exterior 354(a).

In some examples, method 1100 may also include mounting an optical assembly that includes the lens, the display, and the peripheral wall within a housing of an HMD. For example, optical assembly 300 may be mounted within housing 102 of HMD system 100 in FIG. 1.

Method 1100 may also include coupling a strap assembly to the housing. For example, strap assembly 104 may be coupled to housing 102 of HMD system 100 in FIG. 1. In this example, strap assembly 104 may define an audio delivery conduit (such as audio delivery conduit 822 in FIG. 8) that (1) extends from the aperture in a rearward direction toward the user's ear and (2) is dimensioned to direct front-volume sound from the speaker toward a user's ear, as described in greater detail above in connection with FIG. 8.

As detailed above, the optical assemblies and HMD systems described herein may leverage existing display system elements (such as the HMD's eyecups) as an enclosure for one or more speakers, thereby eliminating the need for a separate speaker enclosure. This may, in turn, enable an HMD system to realize the improved accuracy or frequency response offered by larger speaker enclosures without significantly increasing the system's overall size or weight, resulting in an improved audio experience for end users.

While the embodiments shown and described herein include two speakers, any number of speakers may be housed within the enclosures described and illustrated herein while remaining within the scope of this disclosure. In addition, the optical assemblies described herein may be incorporated into any suitable HMD design, including systems designed to measure and account for differing inter-pupillary distances (IPD), moving rail systems, and varifocal systems.

As detailed above, the computing devices and systems described and/or illustrated herein broadly represent any type or form of computing device or system capable of executing computer-readable instructions. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more modules. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display system, comprising:
    a display for presenting content to a user of the head-mounted display system;
    a housing that holds the display;
    a speaker; and
    a strap assembly for supporting the head-mounted display system on the user's head, wherein the strap assembly comprises an audio delivery conduit defined within a strap of the strap assembly and configured to direct sound waves generated by the speaker toward the user's ear from the speaker along and within the strap to an exit port in the strap, wherein the audio delivery conduit is self-contained within the strap,
    wherein the speaker is positioned to overlap an intersection of the strap assembly and the housing.

2. The head-mounted display system of claim 1, wherein the speaker is mounted on the housing.

3. The head-mounted display system of claim 1, wherein the exit port is positioned in the strap to direct the sound waves from the audio delivery conduit toward the user's ear.

4. The head-mounted display system of claim 3, wherein the exit port is positioned proximate to the user's ear when the user dons the head-mounted display system.

5. The head-mounted display system of claim 3, wherein the exit port comprises an elongated slit in the strap of the strap assembly.

6. The head-mounted display system of claim 1, wherein the speaker is positioned and oriented to generate front-volume sound waves to be delivered to the user's ear through the audio delivery conduit.

7. The head-mounted display system of claim 1, wherein the strap assembly is configured to enable the user to adjustably mount the head-mounted display system to the user's head.

8. The head-mounted display system of claim 1, wherein the strap of the strap assembly comprises a side strap, wherein the strap assembly further comprises an upper strap configured to conform to a top of the user's head.

9. The head-mounted display system of claim 1, further comprising a lens positioned for viewing the content presented by the display through the lens.

10. The head-mounted display system of claim 9, wherein the housing comprises a peripheral wall extending from a front end of the housing to a back end of the housing, wherein an enclosure is defined between the display, the peripheral wall, and the lens.

11. The head-mounted display system of claim 10, wherein the speaker is positioned at least partially within the enclosure.

12. The head-mounted display system of claim 10, wherein the speaker is positioned and oriented to emit back-volume sound waves into the enclosure.

13. A head-mounted display system, comprising:
    a display for presenting visual content to an intended user of the head-mounted display system;
    a housing that holds the display;
    a speaker mounted to the housing; and
    a strap assembly for supporting the head-mounted display system on the intended user's head, wherein the strap assembly comprises an audio delivery conduit defined within a strap of the strap assembly and configured to direct sound waves generated by the speaker toward the intended user's ear from the speaker along and within the strap to an exit port in the strap, wherein the audio delivery conduit is self-contained within the strap, wherein the strap assembly is connected to the housing at a location where the speaker is mounted to the housing.

14. The head-mounted display system of claim 13, wherein the strap of the strap assembly comprises a side strap positioned to extend around a side of the intended user's head.

15. The head-mounted display system of claim 13, wherein the speaker is mounted to a peripheral wall of the housing.

16. The head-mounted display system of claim 13, wherein the speaker is mounted to emit front-volume sound to the audio delivery conduit and to emit back-volume sound to an interior of the housing.

17. The head-mounted display system of claim 13, wherein the audio delivery conduit extends from the speaker to an exit port that extends through an inner surface of the strap.

18. A head-mounted display system, comprising:
    a display for presenting visual content to an intended user of the head-mounted display system;
    a housing that supports the display;
    a speaker for presenting audio content to the intended user; and
    a strap assembly coupled to the housing, the strap assembly comprising a strap for supporting the head-mounted display system on the intended user's head, wherein the strap comprises an audio delivery conduit defined within the strap and configured to direct sound waves generated by the speaker toward the intended user's ear from the speaker along and within the strap to an exit port in the strap, wherein the audio delivery conduit is self-contained within the strap,
    wherein the speaker is positioned at an intersection where the strap assembly is coupled to the housing.

19. The head-mounted display system of claim 18, wherein the audio delivery conduit and the speaker are positioned to direct the sound waves generated by the speaker in a rearward direction toward the intended user's ear.

20. The head-mounted display system of claim 1, wherein the exit port comprises an elongated slit positioned on an inward-facing surface of the strap assembly.

* * * * *